US010602123B2

(12) United States Patent
Sim et al.

(10) Patent No.: US 10,602,123 B2
(45) Date of Patent: Mar. 24, 2020

(54) METHOD FOR CREATING A STEREOSCOPIC IMAGE SEQUENCE

(71) Applicant: Creative Technology Ltd, Singapore (SG)

(72) Inventors: Wong Hoo Sim, Singapore (SG); Teck Chee Lee, Singapore (SG); Desmond Hii, Singapore (SG); Xiaoting Liu, Singapore (SG)

(73) Assignee: Creative Technology Ltd, Singapore (SG)

( * ) Notice: Subject to any disclaimer, the term of this patent is extended or adjusted under 35 U.S.C. 154(b) by 0 days.

(21) Appl. No.: 16/060,647

(22) PCT Filed: Dec. 28, 2016

(86) PCT No.: PCT/SG2016/050622
§ 371 (c)(1),
(2) Date: Jun. 8, 2018

(87) PCT Pub. No.: WO2017/116309
PCT Pub. Date: Jul. 6, 2017

(65) Prior Publication Data
US 2018/0367783 A1    Dec. 20, 2018

(30) Foreign Application Priority Data
Dec. 30, 2015    (SG) .............................. 10201510773P (51) Int. Cl.
*H04N 13/221*    (2018.01)
*H04N 13/264*    (2018.01)
*H04N 13/211*    (2018.01)
*H04N 13/296*    (2018.01)
*H04N 13/218*    (2018.01)

(52) U.S. Cl.
CPC ......... *H04N 13/221* (2018.05); *H04N 13/211* (2018.05); *H04N 13/218* (2018.05); *H04N 13/264* (2018.05); *H04N 13/296* (2018.05)

(58) Field of Classification Search
None
See application file for complete search history.

(56) References Cited

U.S. PATENT DOCUMENTS

| 4,807,024 A | 2/1989 | McLaurin et al. |
| 4,842,411 A * | 6/1989 | Wood ................. G01B 11/2545 356/2 |
| 7,180,536 B2 | 2/2007 | Wolowelsky et al. |
| 8,908,011 B2 | 12/2014 | Yamada et al. |
| 9,213,419 B1 * | 12/2015 | Cassidy .................... G06F 3/03 |
| 9,344,701 B2 | 5/2016 | Markas et al. |

(Continued)

*Primary Examiner* — Reza Aghevli
(74) *Attorney, Agent, or Firm* — Russell Swerdon; Desmund Gean (57) ABSTRACT

There is provided a method for creating a stereoscopic image sequence. The method can include capturing a sequence of static images and forming a plurality of image pairs. Each image pair can include a first image and a second image selected from the sequence of static images. Selection of the first image can be done in a manner so that the image pairs are formed a spatially coherent manner. The stereoscopic image sequence can be created based on the image pairs. Creating the stereoscopic image sequence can, for example, relate to producing a stereoscopic video.

15 Claims, 5 Drawing Sheets

(56) References Cited

U.S. PATENT DOCUMENTS

| | | | |
|---|---|---|---|
| 2006/0092272 A1* | 5/2006 | Wolowelsky | H04N 13/221 348/42 |
| 2011/0141227 A1* | 6/2011 | Bigioi | H04N 13/106 348/36 |
| 2012/0019613 A1* | 1/2012 | Murray | H04N 13/106 348/36 |
| 2012/0019614 A1* | 1/2012 | Murray | H04N 13/106 348/36 |
| 2012/0162374 A1* | 6/2012 | Markas | H04N 13/128 348/E13.074 |
| 2012/0188332 A1* | 7/2012 | Yamaguchi | H04N 1/215 348/36 |
| 2012/0229609 A1* | 9/2012 | Yamada | H04N 13/264 348/46 |
| 2013/0107008 A1* | 5/2013 | Muninder | H04N 13/221 348/46 |
| 2013/0250048 A1* | 9/2013 | Aller | H04N 5/23238 348/37 |
| 2014/0181669 A1* | 6/2014 | Tung | G06F 3/0485 715/720 |
| 2014/0267602 A1 | 9/2014 | Tzur et al. | |
| 2015/0116458 A1 | 4/2015 | Barkatullah | |
| 2015/0141755 A1* | 5/2015 | Tesar | G02B 21/368 600/111 |
| 2015/0297311 A1* | 10/2015 | Tesar | G02B 21/16 600/411 |
| 2017/0038598 A1* | 2/2017 | Song | G02B 27/2242 |
| 2017/0165997 A1* | 6/2017 | Holmes | B42D 25/425 |
| 2017/0336638 A1* | 11/2017 | Bos | G02B 27/0172 |

\* cited by examiner

METHOD FOR CREATING A STEREOSCOPIC IMAGE SEQUENCE

FIELD OF INVENTION

The present disclosure generally relates a method for creating a stereoscopic image sequence.

BACKGROUND

A stereoscopic image or video may typically be captured by use of:
1) a stereoscopic camera
2) two separate but synchronized cameras
3) a single camera A stereoscopic camera has fixed lenses (e.g., left and right lenses) for capturing left and right images required for a stereoscopic image. Given that the lenses are fixed in the sense that the position of each lens and distance between the lenses are not adjustable, the use of a stereoscopic camera to capture a stereoscopic image/video is advantageous in that it is user friendly since there is no need for a user to synchronize the left and right images (i.e., by virtue of the fixed lenses). That is, a user is not required to make adjustments (e.g., to the lenses) for the purpose of synchronizing the left and right images. However, it is notable that a stereoscopic camera is highly specialized equipment which may not be accessible (e.g., in view of cost of equipment or availability) to many.

Using two separate but synchronized cameras may be a viable alternative to a stereoscopic camera. However, this is rather cumbersome given the need for two cameras. Moreover, some degree of user intervention may be required to synchronize the two cameras.

The use of a single camera may yet be another alternative since it is possible to obtain left and right images separately (i.e., one shot for the left image and another shot for the right image). However, the success of such use is highly dependent on the skills of the user. For example, the user is required to move the camera in an appropriate manner to take the second shot (e.g., for capturing the right image) after taking the first shot (e.g., for capturing the left image). During user movement of the camera, vertical displacement and/or rotational variance may occur due to imperfect motion, leading to synchronizing issues.

It is therefore desirable to provide a solution to address the foregoing problems.

SUMMARY OF THE INVENTION

In accordance with an aspect of the disclosure, there is provided a method for creating a stereoscopic image sequence, the method can include capturing a sequence of static images and forming a plurality of image pairs. Each image pair can include a first image and a second image selected from the sequence of static images. Selection of the first image can be done in a manner so that the image pairs are formed a spatially coherent manner. The stereoscopic image sequence can be created based on the image pairs. Creating the stereoscopic image sequence can, for example, relate to producing a stereoscopic video.

Each image pair can be associated with a stereo-base which is based on separation between the first and second images. Additionally, the stereo-base is variable based on selection of the first and second images of an image pair.

Selection of the first and second images of an image pair is based on one or both of manual based selection and automatic based selection.

Manual based selection can be by manner of presenting the sequence of static images on a display screen for user selection of the first and second images of an image pair. Automatic based selection can be based on any one of variance in focal length associated with at least one static image, salient object detection and characteristics associated with the static images, or any combination thereof.

In one embodiment, the stereoscopic image sequence can be interactive in a manner such that selection of the first image of an image pair is variable based on user interaction when the stereoscopic image sequence is being viewed.

In another embodiment, the stereoscopic image sequence can include a plurality of stereoscopic images, each of which being formed based on an image pair, wherein the stereoscopic image viewed by a user when a user is viewing the stereoscopic image sequence is variable based on user motion.

BRIEF DESCRIPTION OF THE DRAWINGS

Embodiments of the disclosure are described hereinafter with reference to the following drawings, in which.

DETAILED DESCRIPTION

The present disclosure relates to a method 100 (as will be shown in further detail with reference to FIG. 1) for creating/generating a stereoscopic image sequence, using a sequence of static images. The static images can, for example, be snapshots of a scene taken at regularly spaced time intervals. The snapshots can be taken using an image capturing device such as a camera. In this regard, a snapshot of a scene taken using the image capturing device can be akin to a photograph taken of the scene.

Figure 1:
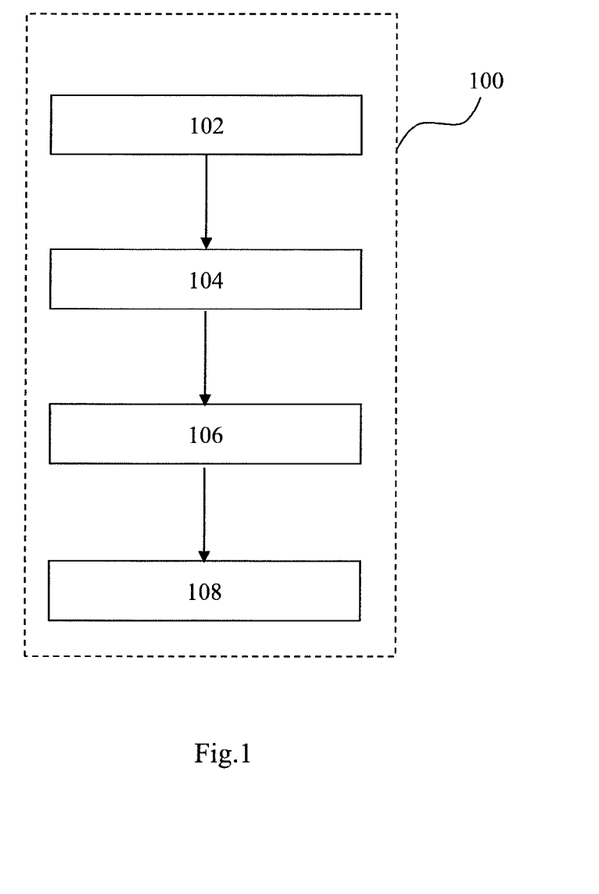
FIG. 1 shows a method 100 for creating/generating a stereoscopic image sequence, using a sequence of static images, according to an embodiment of the disclosure.

Referring to FIG. 1, the method 100 can include a start step 102, a capture step 104, a stop step 106 and a processing step 108.

The method 100 begins at the start step 102 where a user positions the image capturing device at one point of a scene. This is considered a start point where the user begins taking snapshots of the scene. As an option, at the start point, the image capturing device can be configured to focus on an object of interest per user's preference.

The method 100 continues on to the capture step 104 where the user can move the image capturing device from the start point to another point of the scene so as to capture a sequence of static images of the scene. The movement of the image capturing device can be a sweeping type movement.

Capturing of the sequence of static images can end at the stop step 106 where the user has moved the image capturing device, from the start point, to the aforementioned another point. Specifically, the aforementioned another point can be considered to be a stop point where the user has stopped moving the image capturing device.

In practical terms, in relation to the method 100 from the start step 102 to the stop step 106, a user can, holding a camera, sweep the camera from the start point to the stop point so as to capture a sequence of static images of the scene. This can be considered to be akin to a series of photographs taken along the path of the sweep. For example, the user can sweep the camera starting from left side of the scene to right side of the scene. In this regard, the left side of the scene (i.e., start of the sweep) can be considered the start point and the right side of the scene (i.e., end of the sweep) can be considered the end point.

The captured sequence of static images can be processed at the processing step 108 to generate a stereoscopic image sequence. The stereoscopic image sequence can include a plurality of stereoscopic images and a stereoscopic image can be generated by selecting a pair of static images from the captured sequence of static images. Therefore, a stereoscopic image can be generated by an image pair (i.e., a pair of static images) and the stereoscopic image sequence can be generated by selecting a plurality of image pairs (i.e., more than one pair of static images). The selection of image pair(s) will be discussed later in further detail with reference to FIG. 2. It is appreciable that processing can occur during the capture of the sequence of static images and/or after the capture of a complete sequence of static images.

As an option, the sequence of static images and/or the stereoscopic image sequence can be stored. The images can, for example, be stored as a video with various video compression tools [e.g. h.264], list of JPEGs and/or an image pyramid (i.e., for storing multiple resolutions).

Figure 2:
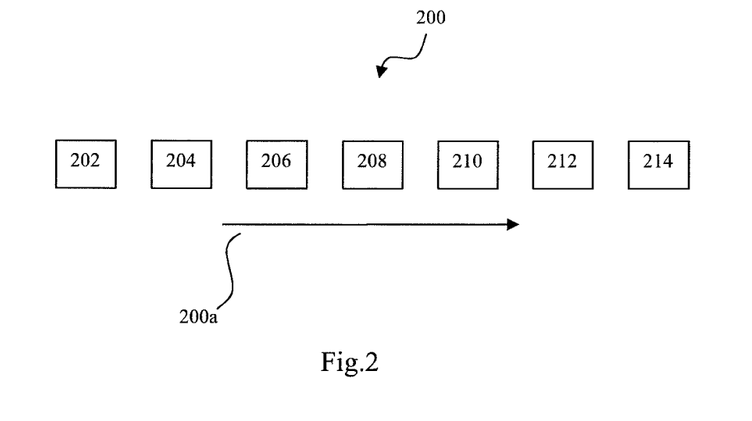
FIG. 2 shows a sequence of static images in relation to the method of FIG. 1, the sequence of static images being captured by moving an image capturing device in an exemplary direction, according to an embodiment of the disclosure.

FIG. 2 shows a sequence of static images 200 as captured per earlier discussion with reference to the method 100 of FIG. 1. An arrow 200a indicates an exemplary direction of the sweep (e.g., from left side to right side of a scene).

The sequence of static images 200 can include a plurality of static images. Specifically, the plurality of static images can include a start image, a plurality of intermediate images and an end image. For example, the plurality of static images can include a first static image 202, a second static image 204, a third static image 206, a fourth static image 208, a fifth static image 210, a sixth static image 212 and a seventh static image 214.

The first static image 202 can correspond to the start image taken at the start point, the intermediate images can include the second to sixth static images 204/206/208/210/212 taken during the sweep between the first and the end points, and the seventh static image 214 can correspond to the end image taken at the end point.

Earlier mentioned, a stereoscopic image can be generated by selecting a pair of static images (i.e., an image pair) from the captured sequence of static images. Therefore, an image pair can be formed by, for example, pairing one static image from the aforementioned first to seventh static images 202/204/206/208/210/212/214 with another static image from the aforementioned first to seventh static images 202/204/206/208/210/212/214.

Based on the exemplary direction of the sweep (e.g., from left side to right side of a scene), the first static image 202 can be considered to be a left side image and the seventh static image 214 can be considered to be a right side image.

Moreover, in an image pair, each of the second to sixth static images 204/206/208/210/212 can be considered to be either a left side image or a right side image depending on which static image each is paired with. Generally, for the intermediate images (e.g., second to sixth static images 204/206/208/210/212), a static image closer in position to the start image (i.e., the first static image 202) can be considered to be a left side image relative to another static image closer in position to the end image (i.e., the seventh static image 214). Conversely, a static image closer in position to the end image can be considered to be a right side image relative to another static image closer in position to the start image.

For example, if the second static image 204 is paired with the third static image 206, the second static image 204 can be considered a left side image and the third static image 206 can be considered a right side image. However, if the third static image 206 is paired with any one of the fourth to sixth static images 208/210/212, the third static image 206 can be considered a left side image and any one of the fourth to sixth static images 208/210/212 paired with the third static image 206 can be considered a right side image. Additionally, if the sixth static image 212 is paired with the seventh static image 214, the sixth static image 212 can be considered a left side image relative to the seventh static image 214.

Generally, an image pair generating/forming a stereoscopic image includes a left side image and a right side image. An image pair can be associated with a stereo-base which is based on the left side image and the right side image. The left side image and the right side image can also be referred to as a "left eye image" and a "right eye image" respectively. The stereo-base associated with an image pair will be discussed later in further detail with reference to FIG. 4.

Further mentioned earlier, the stereoscopic image sequence can include a plurality of stereoscopic images. Preferably, the image pairs generating/forming the stereoscopic image sequence are spatially coherent. Specifically, it is preferable that the stereoscopic image sequence is formed such that the visual flow (as viewed by a user) is not unduly disruptive. More specifically, visual transition from an image pair to the next image pair should be smooth and that a user should not visually perceive "jerking" during transition between image pairs when viewing the stereoscopic image sequence. In this regard, a user viewing the stereoscopic image sequence can, for example, be akin to the user viewing a stereoscopic video and that the user should not visually perceive "jerking" when viewing the stereoscopic video. This will be discussed in further detail with reference to FIG. 3 in relation to FIG. 2.

Figure 3:
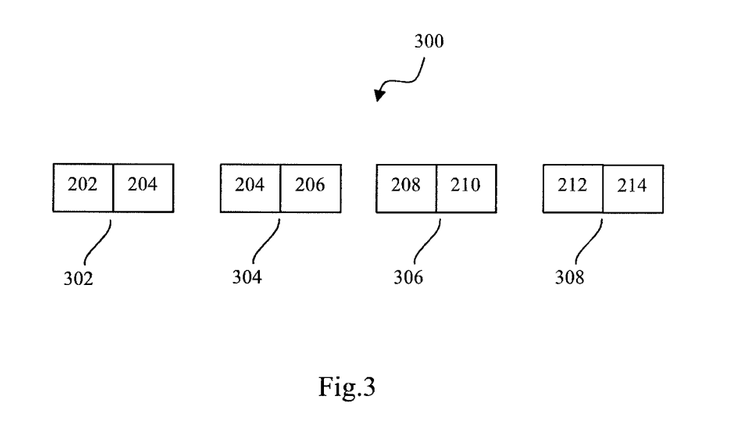
FIG. 3 shows a stereoscopic image sequence which includes a plurality of stereoscopic images, each of which can be formed/generated based on an image pair from the sequence of static images of FIG. 2, according to an embodiment of the disclosure.

FIG. 3 shows a stereoscopic image sequence 300 which includes a plurality of stereoscopic images, each of which can be formed/generated based on an image pair from the sequence of static images 200 of FIG. 2.

For example, the stereoscopic image sequence 300 can include a first stereoscopic image 302, a second stereoscopic image 304, a third stereoscopic image 306 and a fourth stereoscopic image 308. The first to fourth stereoscopic images 302 to 308 can be considered to be, respectively, a first to fourth elements of the stereoscopic image sequence 300. Hence the stereoscopic image sequence 300 can have a sequence which starts with the first element and ends with the fourth element. Specifically, the first element is followed by the second element, the second element is followed by the third element and the third element is followed by the fourth element (i.e., sequentially, the first stereoscopic image 302 is followed by the second stereoscopic image 304 which is followed by the third stereoscopic image 306 which is followed by the fourth stereoscopic image 308).

The first stereoscopic image 302 can, for example, be formed based on an image pair of the first and second static images 202/204. The second stereoscopic image 304 can, for example, be formed based on an image pair of the second and third static images 204/206. The third stereoscopic image 306 can, for example, be formed based on an image pair of the fourth and fifth static images 208/210. The fourth stereoscopic image can, for example, be formed based on an image pair of the sixth and seventh static images 212/214.

Therefore, it is appreciable that each image pair can include a first image and a second image. Per earlier discussion concerning the exemplary direction of the sweep (e.g., from left side to right side of a scene as indicated by arrow 200a), the first image can, for example, correspond to a left side image and the second image can, for example, correspond to a right side image. It is appreciable that if the direction of the sweep is changed (i.e., from right side to left side of a scene instead of from left side to right side of the scene), the foregoing discussed sequence/direction associated with the static images can be changed accordingly. For example, if the image capturing device is swept from the right side to the left side of a scene, the first image can, for example, correspond to a right side image and the second image can, for example, correspond to a left side image. Other examples can include sweeping the image capturing device is a diagonal manner.

Earlier mentioned, it is preferable that the image pairs generating/forming the stereoscopic image sequence are spatially coherent.

Each static image (e.g., first to seventh static images 202/204/206/208/210/212/214) of the sequence of static images 200 can be considered to be one frame of the sequence of static images 200. Moreover, analogous to the earlier discussion concerning sequence in relation to the first to fourth elements of the stereoscopic image sequence 300, the sequence of static images 200 can have a sequence which starts with the first static image 202 and ends with the seventh static image 214 with the first static image 202 followed by the second static image 204 which is in turn followed by the third static image 206 which is in turn followed by the fourth static image 208 and so on.

In order for the image pairs to be considered spatially coherent, the first image of an element should, in general, not be too far sequentially displaced from the first image of the following element. Hence the sequence in relation to the sequence of static images 200 and the sequence in relation to the sequence of the stereoscopic image sequence 300 are to be considered.

For example, in the stereoscopic image sequence 300, the first element is followed by the second element. Therefore, for spatial coherency, the first image associated with the first element and the first image associated with the second element should be in sequence.

More specifically, in earlier examples, where the first stereoscopic image 302 (i.e., the first element) is formed based on an image pair of the first and second static images 202/204, and the second stereoscopic image 304 (i.e., the second element) is formed based on an image pair of the second and third static images 204/206, it can be appreciated that, in relation to the sequence of static images 200, the first image associated with the first element is sequentially followed by the first image associated with the second element.

That is, considering the sequence of static images 200, the first image (i.e., the first static image 202) associated with the first element (i.e., the first stereoscopic image 302) is followed, in sequence, by the first image (i.e., the second static image 204) associated with the second element (i.e., the second stereoscopic image 304). As such, the first element and the second element of the stereoscopic image sequence 300 can be considered to be spatially coherent. Appreciably, selection of the first image of each image pair is done in a manner so that the image pairs can be formed a spatially coherent manner.

In regard to spatial coherency, the present disclosure contemplates that some level of tolerance can be allowed. That is, the first image of one element need not have to be immediately followed (i.e., in the context of the sequence of static images 200) by the first image of a following (i.e., in the context of the stereoscopic image sequence 300) element in order for the two elements to be considered to be spatially coherent. There can be, for example, a tolerance of a difference of one or more frames between the first images of an element and a following element. This can be exemplified by the first and second elements, and the third and fourth elements of the stereoscopic image sequence 300.

Specifically, in regard to the earlier examples where the first stereoscopic image 302 is formed based on an image pair of the first and second static images 202/204, the second stereoscopic image 304 is formed based on an image pair of the second and third static images 204/206, the third stereoscopic image 306 is formed based on an image pair of the fourth and fifth static images 208/210, and the fourth stereoscopic image 308 is formed based on an image pair of the sixth and seventh static images 212/214, it is appreciable that, considering the sequence of static images 200, the first image of the second stereoscopic image 304 immediately follows the first image of the first stereoscopic image 302 (i.e., there is only a single frame gap—which is the second static image 204). This is in contrast to a two frame gap between the first image of the third stereoscopic image 306 and the first image of the fourth stereoscopic image 308. More specifically, the first image of the third stereoscopic image 306 is the fourth static image 208 and the first image of the fourth stereoscopic image 308 is sixth static image 212 and there is a two frame gap (i.e., including the sixth static image 212, the fifth static image 210) between the two first images. Even with a two frame gap, the third element (i.e., the third stereoscopic image 306) and the fourth element (i.e., the fourth stereoscopic image 308) of the stereoscopic image sequence 300 can still be considered to be spatially coherent.

In sum, considering the stereoscopic image sequence 300, the first element (i.e., first stereoscopic image 302) is spatially coherent with the second element (i.e., second stereoscopic image 304), the second element is in turn spatially coherent with the third element (i.e., third stereoscopic image 306), and the third element is in turn spatially coherent with the fourth element (i.e., fourth stereoscopic image 308).

Earlier mentioned, an image pair can be associated with a stereo-base. The stereo-base will now be discussed in further detail with reference FIG. 4 in relation to FIG. 2 and FIG. 3.

Figure 4:
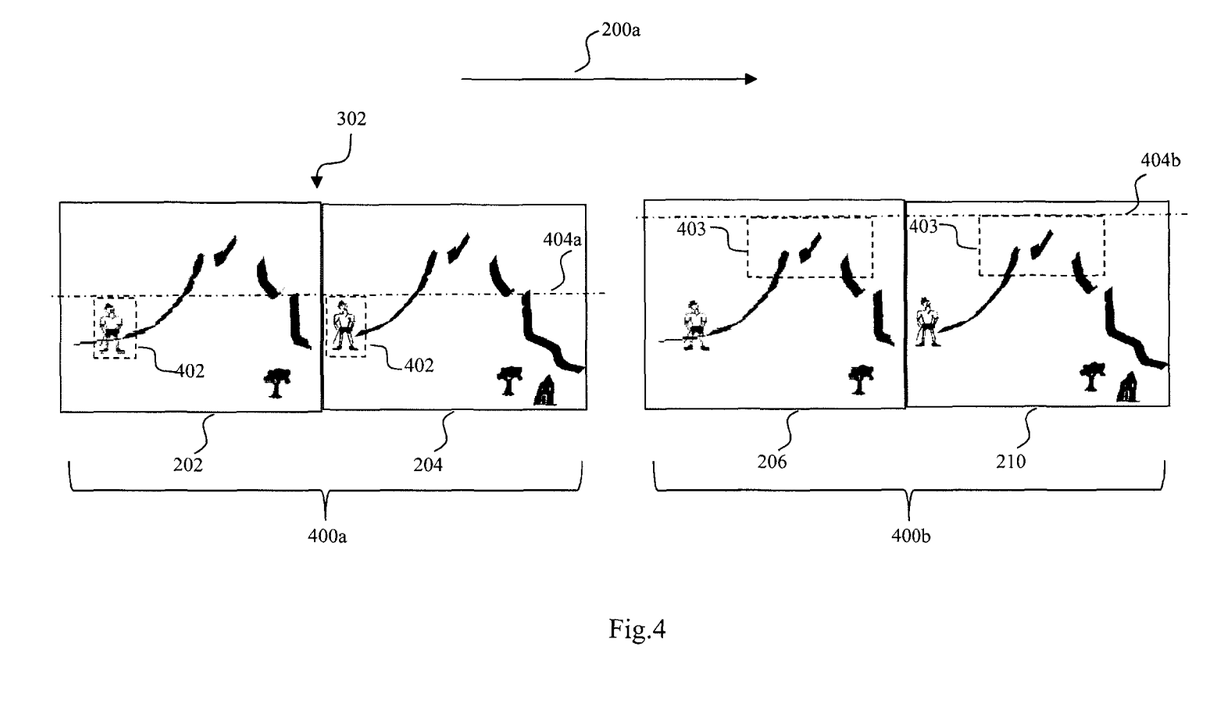
FIG. 4 shows a first snapshot and a second snapshot of a scene taken by a user sweeping an image capturing device in the exemplary direction of FIG. 2, according to an embodiment of the disclosure.

FIG. 4 shows a first snapshot, a second snapshot, a third snapshot and a fourth snapshot of a scene taken by a user sweeping an image capturing device in the exemplary direction, as indicated by arrow 200a, mentioned in FIG. 2. The first and second snapshots can be taken during one portion 400a of the sweep. The third and fourth snapshots can be taken during another portion 400b of the sweep. As shown, the first and second snapshots can be paired to form a first stereoscopic image while the third and fourth snapshots can be paired to form a second stereoscopic image.

As an example, the first stereoscopic image formed can, for example, correspond to the first stereoscopic image 302 as mentioned in FIG. 3. Accordingly, the first and second snapshots can, for example, correspond to the first and second static images 202/204 respectively.

To determine the stereo-base, there is a need to consider projective transformation(s) between two images. In one example, optical flow can be the basis for such consideration. Other examples can include the use of gyroscope/accelerometer/compass to determine such projective transformation(s). Determination of stereo-base will now be discussed in further detail in relation to optical flow.

Optical flow can be generally defined as the pattern of apparent motion of, for example, an object (e.g., an object in a scene) caused by relative motion between the image capturing device (i.e., as moved by a user) and the scene. As such, given that the image capturing device is swept from one point (i.e., the start point) of a scene to another point (i.e., the stop point) of the scene by a user, there is need to consider motion direction of the image capturing device and horizontal displacement.

Specifically, the motion direction is based on the direction of the sweep (e.g., as indicated by arrow 200a). The horizontal displacement, in the context of an object in a scene, can be related to apparent motion of the object caused by relative motion between the image capturing device and the scene. An object in a scene can, for example, be an object of interest 402/403 as shown in FIG. 4.

Based on the considered optical flow, the first image of an image pair can be selected. For example, the sequence of static images 200 can be displayed on a display screen for viewing by a user and the user can select a static image from the sequence of static images 200 as the first image of an image pair. The first image of an image pair can, for example, be a left side image. After the first image of an image pair is selected, the second image can be identified based on the stereo-base to complete the image pair.

Stereo-base can typically be based on object distance. Object distance can, for example, correspond to distance between the image capturing device and an object in the scene. A typical rule of thumb to be observed is a 1:30 ratio. For example if an object of interest in the scene is approximately 90 meters away from the image capturing device, the stereo-base associated with an image pair formed by the first and second snapshots can be 3 meters (i.e., 90 divided by 30, based on the ratio of 1:30). In this regard, stereo-base is typically in direct proportion to object distance.

The present disclosure contemplates that instead of basing stereo-base on object distance, the stereo-base can be based on horizontal displacement in accordance with an embodiment of the disclosure. Horizontal displacement can be quantified in terms of, for example, number of pixels an object of interest 402/403 has "moved"/"shifted" (i.e., owing to apparent motion of the object caused by relative motion between the image capturing device and the scene). Specifically, comparing the first and second snapshots of FIG. 4, it can be appreciated that the object of interest 402 has shifted horizontally (i.e., along dotted line 404) and the horizontal shift can be quantified in terms of number of pixels (e.g., 5 pixels). Thus comparing the first and second snapshots of FIG. 4, it can be appreciated that the object of interest 402 has shifted horizontally by, for example, 5 pixels and the horizontal displacement can, in this case, be considered to be 5 pixels.

In this regard, the present disclosure contemplates stereo-base being based on horizontal displacement instead of object distance. Therefore, it is appreciable that, for the present disclosure, it is a matter of which portion/region of interest (e.g., an object of interest 402) of a static image (e.g., the first static image 202) is being selected/used as a reference for the aforementioned horizontal displacement. Therefore, it is appreciable that stereo-base can be varied depending on portion/region of interest of a static image used/selected.

Appreciably, based on the desired horizontal shift (which can, for example, be user defined or a default setting), the second the second image can be identified to complete the image pair.

In this regard, it is appreciable that the stereo-base associated with an image pair can be considered to be a parameter quantifying separation between the first and second images of an image pair. Specifically, for the sake of illustration/discussion it is contemplated that where the image capturing device is moved in substantially constant velocity, the stereo-base can be quantified in terms of number of frames separating the first and second images in the sequence of static images 200. It is to be noted that, in quantifying separation, the number of frames separating the first and second images should also take into account the second image itself.

In one example, based on the desired horizontal displacement of 5 pixels in relation to an object of interest (e.g., object of interest 402/403) and where the first image corresponds to the second static image 204, the second image which fits the criteria of the desired horizontal displacement of 5 pixels can correspond to the fifth static image 210. In this regard, the stereo-base can correspond to a three frame separation (i.e., including the fifth static image 210, the third and fourth static images 206/208 in between the second and fifth static images 204/210).

In another example, based on the desired horizontal displacement of 5 pixels in relation to an object of interest (e.g., object of interest 402/403) and where the first image corresponds to the second static image 204, the second image which fits the criteria of the desired horizontal displacement of 5 pixels can correspond to the fourth static image 208. In this regard, the stereo-base can correspond to a two frame separation (i.e., including the fourth static image 208, the third static image 206 in between the second and fourth static images 204/208).

It is contemplated that as the image capturing device is swept across a scene, the object of interest can be changed.

For example, referring to FIG. 4, an object of interest can be identified in during one portion 400a of the sweep. Specifically, one object of interest 402 can be identified in relation to the first static image 202 (i.e., the first image of the first stereoscopic image 302) and based on a desired horizontal displacement of 5 pixels in regard to the object of interest 402, the second static image 204 can be identified to complete the image pair (i.e., the second image of the first stereoscopic image 302). However, another object of interest 403 can be identified during another portion of the sweep 400b. Specifically, another object of interest 403 can be identified in relation to the third static image 206. When the third static image 206 is selected as the first image, given the same desired horizontal displacement of 5 pixels in regard to the object of interest 403 (in the third static image 206), the second image fulfilling criteria of the desired horizontal displacement of 5 pixels can correspond to the fifth static image 210 (e.g., in view of the size of the object of interest 403 in the third static image 206 as compared to the object of interest 402 in the first static image 202). In this regard, a stereoscopic image can be formed based on an image pair of the third and fifth static images 206/210. Therefore, it is appreciable that different portions 400a/400b can be associated with differing stereo-bases. Specifically, the stereo-base associated with one portion 400a can be quantified by 1 frame (i.e., the second static image 204) whereas the stereo-base associated with another portion 400b can be quantified by 2 frames (i.e., the fourth and fifth static images 208/210).

It is also contemplated that as the image capturing device is swept across a scene, given the same object of interest (e.g., the object of interest 403 identified in relation to the third static image 206), the second image fulfilling the criteria of the aforementioned desired horizontal displacement can be changed.

For example, it was earlier mentioned that a stereoscopic image can be based on an image pair of the third and fifth static images 206/210 in view of the desired horizontal displacement of 5 pixels of the object of interest 403. However, in a later portion of the sweep (e.g., from the fourth to seventh static images 208/210/212/214), an image pair of the fifth and seventh static images 210/214 could fulfill the same criteria of a horizontal displacement of 5 pixels of the same object of interest 403 (i.e., the object of interest in the fifth static image 210 could be the same as that of the third static image 206). Such phenomena could be possible due to, for example, a curvature in sweeping motion (depending on how a user moves his/her hand which is holding the image capturing device) towards the end of the sweep.

Thus, it is appreciable that stereo-base can be varied as the image capturing device is swept across the scene. It is further appreciable that stereo-base is variable based on selection of the first and second images of an image pair.

It is further appreciable that based on the above discussion, stereo-base can be based on object(s) of interest (and region around the object(s) of interest). An object of interest can be identified based on one or more of the following:
1) automatically detected salient object
2) image capturing device focus region
3) User defined region (i.e., manually defined/selected by a user operating the image capturing device)
4) Vision methods which operates on the entire static image (or a user-defined sub-region) to select good feature(s) to track.

Aside stereo-base being determined based on horizontal displacement of object(s) of interest, other ways of determining stereo-base could be possible. For example:
1) stereo-base could be determined based on focus distance
2) stereo-base could be determined based on characteristics of the snapshots In regard to focus distance, the present disclosure contemplates that the image capturing device can focus the snapshots on an object of interest of a scene. Therefore, during the sweep, it is appreciable that focus distance can vary (e.g., due to relative motion between the image capturing device and the object of interest). In this regard, stereo-base can vary accordingly. Specifically, stereo-base can vary based on variance of the focus distance. In this regard, stereo-base can be considered to be dependent on focus distance associated with the lens of the image capturing device (e.g., camera lens). More specifically, the stereo-base can be considered to be a function of the focus distance.

In regard to characteristics of the snapshots, the image pair quality in regard to maximizing viewing comfort is considered. Specifically, an image pair is considered to be of good quality when one or both of the following conditions is/are fulfilled:
1) negligible or no vertical shift (as indicated by dotted line 404a—It should be noted that the object of interest 402, as between the first and second images of the image pair, has only shifted horizontally and there is negligible or no vertical shift).
2) negligible change in scene between the first and second images—ideally, the object(s) captured in the snapshots should not have moved (movement of an object in the snapshots should be distinguished from the aforementioned apparent motion in that "movement of the object(s)" would mean that the object(s) actually changed position in the scene per se whereas apparent motion, as explained earlier, is caused by relative motion between the image capturing device and the scene without the object(s) actually changing position in the scene) and the lighting condition is unchanged.

Where the first image of an image pair is selected is a left side image, a user can select a right side image which satisfies the above conditions. For example, where the stereo-base is predetermined to be, for example, 5 frames (based on the aforementioned desired horizontal displacement), a user can select another static image from the sequence of static images 200 if the second image based on the stereo-base of 5 frames does not meet the above conditions for good quality image pair. In a more specific example, if the second image based on the stereo-base of 5 frames is deemed (e.g., by the user) to have too much vertical shift compared to the first image, the stereo-base can be reduced to 2 frames if the second image based on the stereo-base of 2 frames is deemed to have negligible vertical shift relative to the first image. Selection of the right side image can be by manner of a user making a selection from the sequence of static images 200 displayed on a display screen. Alternatively, instead of user selection of a right side image which satisfies the above conditions, it is appreciable that an automatic selection of a right side image (i.e., where the first image of an image pair is selected is a left side image) is possible by use of a processor capable of image processing/comparison (e.g., automatic selection by the processor can be based on information obtained from projective transformation/salient object tracking) to identify a right side image which satisfies the above conditions. Moreover, the issue of vertical shift will be discussed later in further detail with reference to FIG. 5.

Appreciably determining stereo-base on the basis of the characteristics of the snapshots grants a user control and flexibility in that if a portion of the sequence of static images 200 is deemed unusable/unsuitable (e.g., due to substantial vertical shift) for the purpose of creating an image pair, the stereo-base for that portion can be reduced to zero.

For example, in the sequence of static images 200, the first and second static images 202/204 are considered suitable (i.e., a first suitable portion) for generating an image pair, the second to fourth static images 204/206/208 are deemed to be the aforementioned unusable/unsuitable portion and the fifth to seventh static images 210/212/214 are considered suitable (i.e., a second suitable portion) for generating an image pair.

An image pair can be formed based on the first suitable portion and the stereo-base can initially be quantified in terms of, for example, number of pixels. Following the first suitable portion, where the portion (e.g., the second to fourth static images 204/206/208) is not suitable for creating an image pair, a user can reduce the stereo-base to zero (from the initial stereo-base associated with the first suitable portion) by selecting two identical images to create the image pair (e.g., the user can select the second static image 204 to be both the first and second images of an image pair). Following the unusable/unsuitable portion, another image pair can be formed based on the second suitable portion and the stereo-base can be increased/expanded (from the reduced to zero stereo-base associated with the unusable/unsuitable portion). In this regard, it is appreciable that the stereo-base can be adjusted/varied according to characteristics of the snapshots in the sequence of static images 200.

Therefore, it is appreciable that stereo-base of one or more image pairs can be varied automatically (e.g., automatic salient object detection and/or characteristics of the snapshots) and/or manually (e.g., user definition and/or characteristics of the snapshots).

Moreover, it is appreciable that stereo-base can be modified/varied dynamically when forming the stereoscopic images (e.g., first to fourth stereoscopic image 302/304/306/308) of the stereoscopic image sequence 300. More specifically, it is appreciable that dynamic modification of stereo-base in real-time can be facilitated (e.g., by manner of automatic salient object detection, characteristics of the snapshots, focal length of a snapshot and/or user definition).

The issue of vertical shift will now be discussed with reference to FIG. 5 hereinafter in the context of the earlier example where the portion unusable/unsuitable for creating an image pair includes the second to fourth static images 204/206/208.

Figure 5:
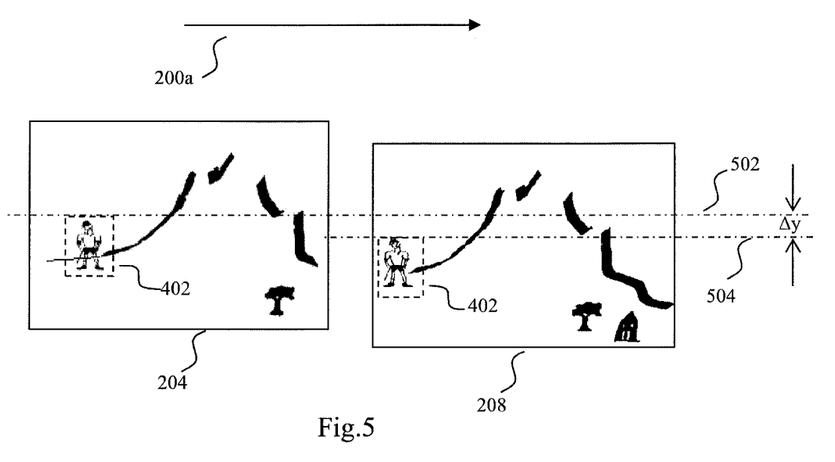
FIG. 5 illustrates the issue of vertical shift which may render a portion of the sequence of static images of FIG. 2 unusable/unsuitable for creating an image pair, according to an embodiment of the disclosure.

As shown in FIG. 5, in the sequence of static images 200, there can be a notable vertical shift in position of the object of interest 402 when the second static image 204 is compared with the fourth static image 208 as indicated by dotted lines 502 and 504. The object of interest 402 can be considered to be vertically displaced (i.e., Δy as indicated in FIG. 5) when the second static image 204 is compared with the fourth static image 208. Such vertical displacement can render the second and fourth static images 204/208 unsuitable/unusable for creating an image pair.

The present disclosure contemplates that this can happen due to, for example, poor user control of the image capturing device when performing the sweep. For example, the user may have been holding the image capturing device in an unsteady manner, thus causing a jerk, when performing the sweep. Ideally, the sequence of static images 200 should be captured in a manner such that vertical shift between the static images is negligible (i.e., ideally, only horizontal displacement owing to apparent motion of, for example, an object caused by relative motion between the image capturing device and the scene should result from the sweep).

The foregoing will now be put in context with reference to an exemplary application as will be discussed with reference to FIG. 6 hereinafter.

Figure 6:
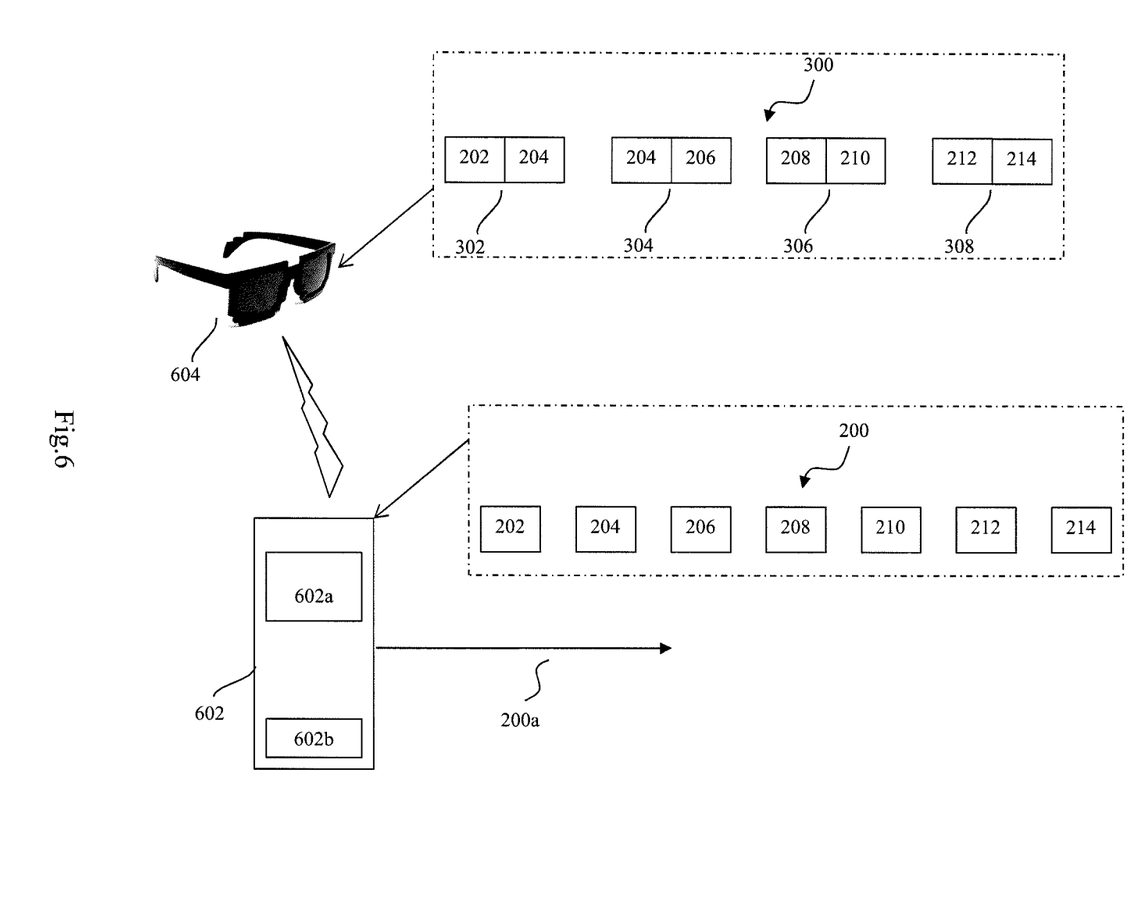
FIG. 6 shows an exemplary application where image capturing device configurable to communicate with a viewing device, according to an embodiment of the disclosure.

FIG. 6 shows an image capturing device 602 which can be configured to communicate with a viewing device 604. The image capturing device 602 can, for example, be a Smartphone with a camera which can be used by a user (not shown) to perform a sweep (e.g., in the aforementioned exemplary direction as indicated by arrow 200a) of a scene (not shown) to capture the aforementioned sequence of static images 200 of the scene. The viewing device 604 can, for example, be a head mounted display worn by the user for viewing the aforementioned stereoscopic image sequence 300 created based on the sequence of static images 200.

The image capturing device 602 can include a processor (not shown), a sensing device (not shown), a display module 602a and a user input module 602b. Specifically, the image capturing device 602 can have a casing shaped and dimensioned to carry the processor, the sensing device, the display module 602a and the user input module 602b. The processor and the sensing device can, for example, be carried within the casing. Moreover, the casing can carry the display module 602a and the user input module 602b such that both are exposed to view and accessible.

The display module 602a can, for example, be a touch screen based display. The sequence of static images 200 can be displayed on the display module 602a for viewing by a user and the user can select one of the static image (e.g., the first static image 202) as the first image of an image pair by making contact with the portion of the display module 602a displaying the desired static image (e.g., the first static image 202). In this regard, image selection data indicative of the first image (of an image pair) selected can be communicated from the display module 602a.

The user input module 602b can be a hardware based portion such as a slider which allows the user to define the aforementioned desired horizontal displacement. Accordingly, the user can also use the user input module 602b to vary the horizontal displacement whenever desired by, for example, sliding the slider. In this regard, horizontal displacement data indicative of the desired horizontal displacement can be communicated from the user input module 602b.

The sensing device can be configured to sense/detect the direction of the sweep. For example, the sensing device can be a gyroscope-accelerometer-compass and optical flow can be determined based on the direction of the sweep as sensed by the sensing device. In this regard, sensing data indicative of optical flow can be communicated from the sensing device.

The processor can, for example, be a microprocessor configured to receive and process the image selection data and/or the stereo-base data, and the sensing data in a manner so as appropriately pair the static images in the sequence of static images 200 to create the stereoscopic image sequence 300. Processing by the processor can include video stabilization. Processing by the processor can further include geometrically aligning the first and second images of one or more image pairs by performing image warping to reduce vertical shift. Processing by the processor can yet further include smoothing amount of image warping to prevent abrupt change(s) (i.e., visually perceivable "jerking") during transition between image pairs. Smoothing the amount of image warping can be made possible by implementation of low-pass and/or Kalman filters in the processor (e.g., Digital Signal Processing). Processing by the processor can additionally include formatting the image pairs to a suitable geometry for display (i.e., by the viewing device 604).

In regard to video stabilization, the present disclosure contemplates video stabilization more in the context of performing both rotation and vertical translation correction, and lesser in the context of performing horizontal translation correction.

The image capturing device can be further configured to communicate the stereoscopic image sequence 300 to the viewing device 604 which can, for example, be worn by a user for viewing the stereoscopic image sequence 300.

Preferably, the stereoscopic image sequence 300 can be interactive in the sense that:

1) The first image (i.e., of an image pair) selected can be based on user interaction when viewing the stereoscopic image sequence 300; and/or
2) The stereoscopic image (e.g., any of the first to fourth stereoscopic images 302/304/306/308) viewed by a user is changed according to user motion.

In one example, in regard to selection of the first image based on user interaction, when a user who is wearing the viewing device 604 turns his/her head, the first image selected can be based on turning motion of the user's head. Specifically, where the first image of an image pair is initially the third static image 206, the first image of the image pair can be changed to, for example, the second static image 204 if the user turns his/her head to the left. Accordingly, an image pair based on the second static image 204 can be created when the user turns his/her head to the left. Conversely, if the user turns his/her head to the right, the first image of the image pair can be changed to, for example, the fifth static image 210 and an image pair based on the fifth static image 210 as the first image can be created accordingly. Appreciably, the viewing device 604 can optionally include a sensing device (analogous to that of the image capturing device 602) for sensing user motion. Moreover, a feedback signal indicative of user motion can be communicated from the viewing device 604 to the image capturing device 602 to vary the selection of the first image of an image pair. In this regard, it is appreciable that an image pair, and consequently the stereoscopic image sequence 300, can be created in a contactless manner (as opposed to user making contact with the display module 602a to make a selection) by detecting user motion (i.e., contactless user interaction).

In another example, in regard to change in stereoscopic image viewed by a user according to user motion, the user who is wearing the viewing device 604 could initially be viewing the second stereoscopic image 304. When the user turns his/her head to the left, the user could be viewing the first stereoscopic image 302 instead of the initial second stereoscopic image 304. Conversely, when the user turns his/her head to the right, the user could be viewing the fourth stereoscopic image 308 instead of the initial second stereoscopic image 304.

The above discussed exemplary application can be useful for:

1) object view type sweep where a user sweeps the image capturing device around an object of interest (i.e., capturing a sequence of static images 200 of only the object itself).
2) Selfie type sweep, where a user can hold the image capturing device at an arm's length pointing towards the user himself/herself and sweeping the image capturing device in an arc (i.e., capturing a sequence of static images 200 of only the user himself/herself)
3) Panoramic type sweep.

In the foregoing manner, various embodiments of the disclosure are described for addressing at least one of the foregoing disadvantages. Such embodiments are intended to be encompassed by the following claims, and are not to be limited to specific forms or arrangements of parts so described and it will be apparent to one skilled in the art in view of this disclosure that numerous changes and/or modification can be made, which are also intended to be encompassed by the following claims.

For example, the aforementioned exemplary application contemplates that the image capturing device 602 carries the processor. It is appreciable that such a processor can be carried by the viewing device (e.g., the image capturing device 602 can communicate the sequence of static images 200 to the viewing device 604 for processing by the processor carried by the viewing device 604). It is also appreciable that the image capturing device 602 and the viewing device 604 can each carry a processor (i.e., a portion of the processing can be handled by the processor carried by the image capturing device and another portion of the processing can be handled by the processor carried by the viewing device 604).

In another example, during the sweep, audio (i.e., audible sounds from the scene) can also be captured and played back during viewing of the stereoscopic image sequence 300 to enhance viewing experience.

In yet another example, a user interface (UI) can be displayed (e.g., via the display module 602a of the image capturing device 602) to indicate to a user whether a sweep or portions or the sweep can be used for creating an image pair. The UI could, for example, indicate whether the user's hand holding the image capturing device is unsteady during the sweep.

In yet a further example, although it is mentioned, in relation to the stop step 106, the stop point is considered to be where the user has stopped moving the image capturing device, it is appreciable that the stop point can occur at any time before the user has stopped moving the image capturing device in an automatic manner (e.g., by setting a timer in the image capturing device to stop capture regardless whether or not the user has stopped moving the image capturing device).

The invention claimed is:

1. A method for creating a stereoscopic image sequence, the method comprising:
    capturing a sequence of static images of a scene with an image capturing device moving in a sweeping motion across the scene such that each captured static image corresponds to a different portion of the scene; and
    forming a plurality of image pairs, each image pair comprising a first image and a second image selected from the sequence of static images, selection of the first image being done in a manner so that the image pairs are formed in a spatially coherent manner,
    wherein each image pair is associable with a stereo-base that is based on separation between the first and second images, the stereo-base being variable, and
    wherein the stereoscopic image sequence is created based on the image pairs.

2. The method of claim 1, wherein the stereo-base is variable based on selection of the first and second images of each image pair.

3. The method of claim 2, wherein selection of the first and second images of each image pair is based on at least one of manual based selection and automatic based selection.

4. The method of claim 3, wherein manual based selection is by manner of presenting the sequence of static images on a display screen for user selection of the first and second images of an image pair.

5. A method for creating a stereoscopic image sequence, the method comprising:
    capturing a sequence of static images; and
    forming a plurality of image pairs, each image pair comprising a first image and a second image selected from the sequence of static images, selection of the first image being done in a manner so that the image pairs are formed in a spatially coherent manner, wherein each image pair is associable with a stereo-base that is based on separation between the first and second images, the stereo-base being variable, wherein the stereoscopic image sequence is created based on the image pairs, wherein the stereo-base is variable based on selection of the first and second images of each image pair, wherein selection of the first and second images of each image pair is based on at least one of manual based selection and automatic based selection, and wherein automatic based selection is based on at least one of variance in focal length associated with at least one static image, salient object detection and characteristics associated with the static images.

6. The method of claim 1, wherein the stereoscopic image sequence is interactive in a manner such that selection of the first image of an image pair is variable based on user interaction when the stereoscopic image sequence is being viewed.

7. The method of claim 1,
wherein the stereoscopic image sequence comprises a plurality of stereoscopic images, each of which is being formed based on an image pair, and
wherein the stereoscopic image viewed by a user when a user is viewing the stereoscopic image sequence is variable based on user motion.

8. The method of claim 1, wherein creating the stereoscopic image sequence relates to producing a stereoscopic video.

9. The method of claim 1, wherein stereo-base is variable in real-time in creating the stereoscopic image sequence.

10. The method of claim 1,
wherein an object of interest is common to the first image and second image, and
wherein stereo-base is based on a horizontal displacement of the object of interest between the first image and the second image.

11. The method of claim 10, wherein the horizontal displacement is measured in pixels.

12. The method of claim 10, wherein the object of interest is varied between image pairs in the stereoscopic image sequence.

13. The method of claim 1, wherein the stereo-base is set in terms of frames separating the first and second images in the sequence of static images.

14. The method of claim 1, wherein the stereo-base is different between image pairs.

15. The method of claim 1, wherein selection of the second image is based on varying the stereo-base.

* * * * *